United States Patent
Wang et al.

(10) Patent No.: US 12,156,268 B2
(45) Date of Patent: Nov. 26, 2024

(54) WIRELESS LOCAL AREA NETWORK COMMUNICATION METHOD AND APPARATUS, MEDIUM, AND ELECTRONIC DEVICE

(71) Applicant: TENCENT TECHNOLOGY (SHENZHEN) COMPANY LIMITED, Shenzhen (CN)

(72) Inventors: Hao Wang, Shenzhen (CN); Xin Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 17/719,578

(22) Filed: Apr. 13, 2022

(65) Prior Publication Data
US 2022/0240334 A1 Jul. 28, 2022

Related U.S. Application Data

(63) Continuation of application No. PCT/CN2021/095021, filed on May 21, 2021.

(30) Foreign Application Priority Data

Jun. 23, 2020 (CN) .......................... 202010583924.4

(51) Int. Cl.
*H04W 76/15* (2018.01)
*H04W 28/08* (2023.01)
(Continued)

(52) U.S. Cl.
CPC ....... *H04W 76/15* (2018.02); *H04W 28/0967* (2020.05); *H04W 28/20* (2013.01);
(Continued)

(58) Field of Classification Search
None
See application file for complete search history.

(56) References Cited

U.S. PATENT DOCUMENTS

| 2005/0185613 A1 | 8/2005 | Kowalski et al. |
| 2011/0065440 A1 | 3/2011 | Kakani |

(Continued)

FOREIGN PATENT DOCUMENTS

| CN | 101242576 A | 8/2008 |
| CN | 101326775 A | 12/2008 |

(Continued)

OTHER PUBLICATIONS

International Search Report with English translation and Written Opinion regarding PCT/CN2021/095021 dated Aug. 20, 2021, 9 pages.

(Continued)

*Primary Examiner* — Anh Ngoc M Nguyen
(74) *Attorney, Agent, or Firm* — Crowell & Moring LLP

(57) ABSTRACT

Embodiments of this application provide a wireless local area network communication method and apparatus, a medium, and an electronic device. The method includes selecting a first communication link and at least one second communication link from candidate communication links according to a data flow; generating an adding traffic stream (ADDTS) request frame, the ADDTS request frame comprising indication information for indicating the at least one second communication link; and transmitting the ADDTS request frame through the first communication link, the ADDTS request frame being used for requesting establishment of a traffic stream for transmitting the data flow on the first communication link and the at least one second communication link respectively.

17 Claims, 9 Drawing Sheets

(51) Int. Cl.
  *H04W 28/20* (2009.01)
  *H04W 40/12* (2009.01)
  *H04W 40/24* (2009.01)
  *H04W 72/044* (2023.01)
  *H04W 84/12* (2009.01)

(52) U.S. Cl.
  CPC ......... *H04W 40/12* (2013.01); *H04W 40/248* (2013.01); *H04W 72/044* (2013.01); *H04W 84/12* (2013.01)

(56) References Cited

U.S. PATENT DOCUMENTS

| | | | |
|---|---|---|---|
| 2011/0141968 A1 | 6/2011 | Trainin | |
| 2011/0261735 A1 | 10/2011 | Cordeiro | |
| 2011/0261754 A1* | 10/2011 | Trainin | H04L 1/1621 370/328 |
| 2018/0227814 A1* | 8/2018 | Reial | H04W 36/00837 |

FOREIGN PATENT DOCUMENTS

| | | |
|---|---|---|
| CN | 102098734 A | 6/2011 |
| CN | 102480317 A | 5/2012 |
| CN | 104115542 A | 10/2014 |
| CN | 111066271 A | 4/2020 |
| CN | 111787544 A | 10/2020 |
| KR | 20100119084 A | 11/2010 |
| KR | 20110095123 A | 8/2011 |
| WO | WO 2019050704 A1 | 3/2019 |
| WO | WO 2020112020 A1 | 6/2020 |

OTHER PUBLICATIONS

Extended European Search Report regarding EP 21 82 9986 dated Dec. 9, 2022, 13 pages.
Harry Wang (Tencent): "Multilink Traffic Stream (TS) Operation," IEEE Draft, 11-20-0908-00-00Be-Multilink-TS-Operation, IEEE-SA Mentor, Piscataway, NJ, vol. 802.11 EHT; 802.11-20/0908r0, Jun. 29, 2020, pp. 1-18.
Chinese Office Action with English concise explanation of relevance regarding 202110701519.2 dated Apr. 2, 2024, 10 pages.
Chinese Office Action with English concise explanation of relevance regarding 202110701520.5 dated Feb. 2, 2024, 8 pages.

* cited by examiner

WIRELESS LOCAL AREA NETWORK COMMUNICATION METHOD AND APPARATUS, MEDIUM, AND ELECTRONIC DEVICE

RELATED APPLICATION

This application is a continuation application of PCT Patent Application No. PCT/CN2021/095021, filed on May 21, 2021, which claims priority to Chinese Patent Application No. 202010583924.4 filed with the China National Intellectual Property Administration on Jun. 23, 2020, both of which are incorporated herein by reference in their entireties.

FIELD OF THE TECHNOLOGY

This application relates to the field of computer and communication technologies, and specifically, to a wireless local area network communication technology.

BACKGROUND OF THE DISCLOSURE

In current wireless fidelity (Wi-Fi) devices, when communicating, one link is usually established to transmit data flow. However, in the next-generation standard IEEE 802.11be, a plurality of links may be established at the same time in the Wi-Fi devices. In this case, how to coordinate and manage the plurality of links established in the Wi-Fi devices is a technical problem that needs to be resolved urgently.

SUMMARY

Embodiments of this application provide a wireless local area network communication method and apparatus, a medium, and an electronic device, which can establish a traffic stream on a plurality of communication links, improving the capability of processing data flow, thereby helping improve the transmission efficiency of data flow.

The present disclosure describes a method for wireless local area network communication. The method includes selecting, by a device comprising a memory storing instructions and a processor in communication with the memory, a first communication link and at least one second communication link from candidate communication links according to a data flow; generating, by the device, an adding traffic stream (ADDTS) request frame, the ADDTS request frame comprising indication information for indicating the at least one second communication link; and transmitting, by the device, the ADDTS request frame through the first communication link, the ADDTS request frame being used for requesting establishment of a traffic stream for transmitting the data flow on the first communication link and the at least one second communication link respectively.

The present disclosure describes an apparatus for wireless local area network communication. The apparatus includes a memory storing instructions; and a processor in communication with the memory. When the processor executes the instructions, the processor is configured to cause the apparatus to perform: selecting a first communication link and at least one second communication link from candidate communication links according to a data flow, generating an adding traffic stream (ADDTS) request frame, the ADDTS request frame comprising indication information for indicating the at least one second communication link, and transmitting the ADDTS request frame through the first communication link, the ADDTS request frame being used for requesting establishment of a traffic stream for transmitting the data flow on the first communication link and the at least one second communication link respectively.

The present disclosure describes a non-transitory computer-readable storage medium, storing computer-readable instructions. The computer-readable instructions, when executed by a processor, are configured to cause the processor to perform: selecting a first communication link and at least one second communication link from candidate communication links according to a data flow; generating an adding traffic stream (ADDTS) request frame, the ADDTS request frame comprising indication information for indicating the at least one second communication link; and transmitting the ADDTS request frame through the first communication link, the ADDTS request frame being used for requesting establishment of a traffic stream for transmitting the data flow on the first communication link and the at least one second communication link respectively.

According to an aspect of the embodiments of this application, a wireless local area network communication method is provided, including: selecting a first communication link and at least one second communication link from candidate communication links according to a to-be-transmitted data flow; generating an ADDTS request frame, the ADDTS request frame including indication information for indicating the at least one second communication link; and transmitting the ADDTS request frame through the first communication link, the ADDTS request frame being used for requesting establishment of a traffic stream for transmitting the data flow on the first communication link and the at least one second communication link respectively.

According to an aspect of the embodiments of this application, a wireless local area network communication method is provided, including: receiving an ADDTS request frame through a first communication link, the ADDTS request frame including indication information for indicating at least one second communication link, the first communication link and the at least one second communication link being used for transmitting a same data flow; generating an ADDTS response frame for the ADDTS request frame; and transmitting the ADDTS response frame through the first communication link, to respectively establish a traffic stream for transmitting the data flow on the first communication link and the at least one second communication link.

According to an aspect of the embodiments of this application, a wireless local area network communication apparatus is provided, including: a selection unit, configured to select a first communication link and at least one second communication link from candidate communication links according to a to-be-transmitted data flow; a first generation unit, configured to generate an ADDTS request frame, the ADDTS request frame including indication information for indicating the at least one second communication link; and a first transmission unit, configured to transmit the ADDTS request frame through the first communication link, the ADDTS request frame being used for requesting establishment of a traffic stream for transmitting the data flow on the first communication link and the at least one second communication link respectively.

According to an aspect of the embodiments of this application, a wireless local area network communication apparatus is provided, including: a receiving unit, configured to receive an ADDTS request frame through a first communication link, the ADDTS request frame including indication information for indicating at least one second communication link, the first communication link and the at least one second communication link being used for transmitting a same data flow; a second generation unit, configured to generate an ADDTS response frame for the ADDTS request frame; and a second transmission unit, configured to transmit the ADDTS response frame through the first communication link, to respectively establish a traffic stream for transmitting the data flow on the first communication link and the at least one second communication link.

According to an aspect of the embodiments of this application, a computer-readable medium is provided, storing a computer program, the computer program, when executed by a processor, implementing the wireless local area network communication method according to the foregoing embodiments.

According to an aspect of the embodiments of this application, an electronic device is provided, including: one or more processors; and a storage apparatus, configured to store one or more programs, the one or more programs, when executed by the one or more processors, causing the one or more processors to implement the wireless local area network communication method according to the foregoing embodiments.

According to an aspect of the embodiments of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the wireless local area network communication method provided in the various optional embodiments.

In the technical solutions provided by some embodiments of this application, a first communication link and at least one second communication link are selected from candidate communication links according to a to-be-transmitted data flow, an ADDTS request frame including indication information for indicating the at least one second communication link is generated, and the ADDTS request frame is transmitted through the first communication link, to request establishment of a traffic stream on the first communication link and the at least one second communication link respectively. In the foregoing solutions, a traffic stream is established on a plurality of communication links by transmitting an ADDTS request frame on a communication link, so that the plurality of communication links can support one traffic stream at the same time, improving the capability of processing data flow, thereby helping improve the transmission efficiency of data flow.

DESCRIPTION OF EMBODIMENTS

Figure 1:
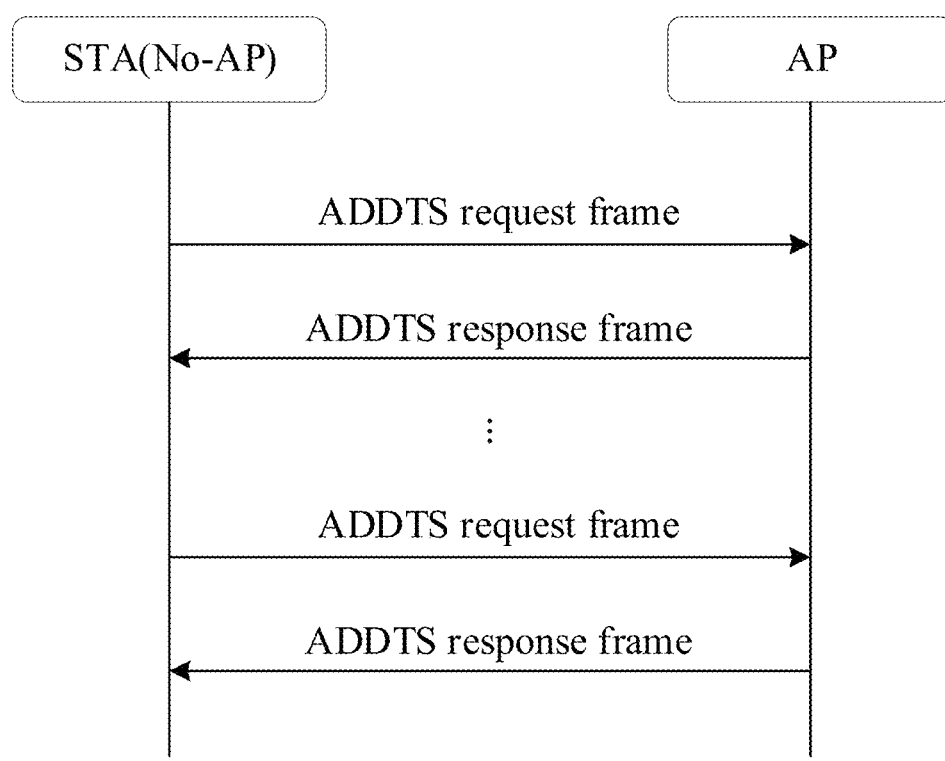
FIG. 1 is a schematic diagram of an interaction process of establishing a traffic stream between a station and an access point.

A traffic stream (TS) is usually established between Wi-Fi devices by transmitting an add TS (ADDTS) request frame and an ADDTS response frame. In some implementations, ADDTS may be known as adding TS. As shown in FIG. 1, generally, the process of adding a traffic stream is initiated from a non-AP station (STA) to an access point (AP), that is, the STA transmits the ADDTS request frame to the AP, and the AP replies with the ADDTS response frame. The two repeat this process to negotiate quality of service (QoS) parameters used by the traffic stream, and the AP decides whether to accept the traffic stream. If accepted, corresponding transmission resources are reserved for the traffic stream. In terms of network, this process is also referred to as admission control.

The most important parameter in the ADDTS request frame and the ADDTS response frame is a TSPEC information element. The ADDTS request frame transmitted by the STA includes requested TSPEC. The ADDTS response frame replied by the AP includes modified TSPEC. After the two reach an agreement, the AP adds a "success" field to the ADDTS response frame to indicate that the TS has been successfully created.

The fields included in the ADDTS response frame are shown in Table 1. In addition to TSPEC, it also includes other fields:

TABLE 1

| Number | Information | Annotation |
|---|---|---|
| 1 | Category | |
| 2 | QoS Action | |
| 3 | Dialog Token | |
| 4 | TSPEC | |
| 5 | Traffic classification (TCLAS) | Optional |
| 6 | TCLAS Processing | Optional |
| 7 | U-APSD Coexistence | Optional |
| 8 | Expedited Bandwidth Request | Optional |
| 9 | Intra-Access Category Priority | Optional |
| 10 | Higher Layer Stream ID | Only in AP-initiated TS setup |
| 11 | Multi-band | Optional |
| 12 | Upper Layer Protocol Identification (U-PID) | Optional |
| 13 | Multiple MAC Sublayers | Optional |

In Table 1, U-APSD represents unscheduled automatic power save delivery.

Figure 2:
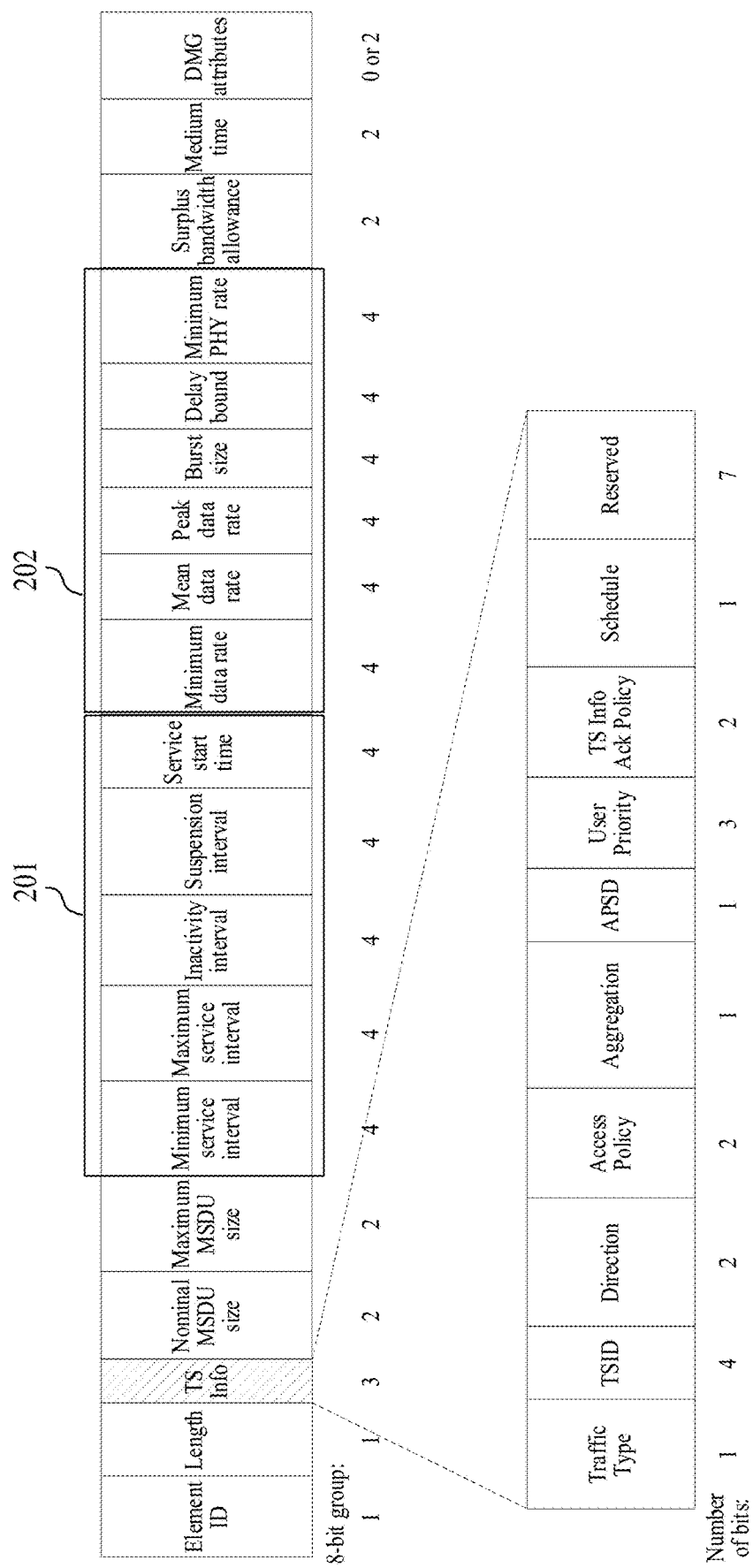
FIG. 2 is a schematic structural diagram of a TSPEC field.

The structure of TSPEC is shown in FIG. 2, and the fields and the annotation of the fields included therein are shown in Table 2:

TABLE 2

| Number | Field | Annotation |
|---|---|---|
| 1 | Element ID | Number of information element |
| 2 | Length | Length of information element |
| 3 | TS info | Traffic stream information |
| 4 | Nominal MSDU size | Nominal MSDU length, representing MSDU with a fixed length or a nominal MSDU length with a variable length |
| 5 | Maximum MSDU size | Maximum MSDU length |
| 6 | Minimum service interval | The minimum interval between two consecutive service cycles, in microseconds |
| 7 | Maximum service interval | The maximum interval between two consecutive service cycles, in microseconds |
| 8 | Inactivity interval | The time interval in which no MSDU arrives, in microseconds |
| 9 | Suspension interval | The duration that no MSDU arrives before stopping generating continuous CF polls, in microseconds |
| 10 | Service start time | The time when service starts |
| 11 | Minimum data rate | The minimum data rate delivered from the upper layer |
| 12 | Mean data rate | Average data rate |
| 13 | Peak data rate | Data rate at peak |
| 14 | Burst size | The maximum burst size at peak rate |
| 15 | Delay bound | The maximum time from the MSDU to the MAC-SAP until the MAC layer transmission is completed, in microseconds |
| 16 | Minimum PHY rate | Minimum physical layer rate |
| 17 | Surplus bandwidth allowance | Additional resources allocated for TS |
| 18 | Medium time | Integer multiple of 32 µs/s, the time reserved for TS, not applicable in HCCA mode |
| 19 | DMG attributes | Parameter used by DMG device |

Referring to FIG. 2, in TSPEC, the field part indicated by the reference number 201 is used to indicate the resource information allocated to the Media Access Control (MAC)/Physical (PHY) layer, and the field part indicated by the reference number 202 is used to indicate the QoS requirements that can be provided for the MAC/PHY layer.

Still referring to FIG. 2, the TS Info field in TSPEC indicates specific information of the TS, including traffic type, TSID, direction, access policy, aggregation, APSD, user priority, TS info ack policy, schedule, and reserved field.

Figure 3:
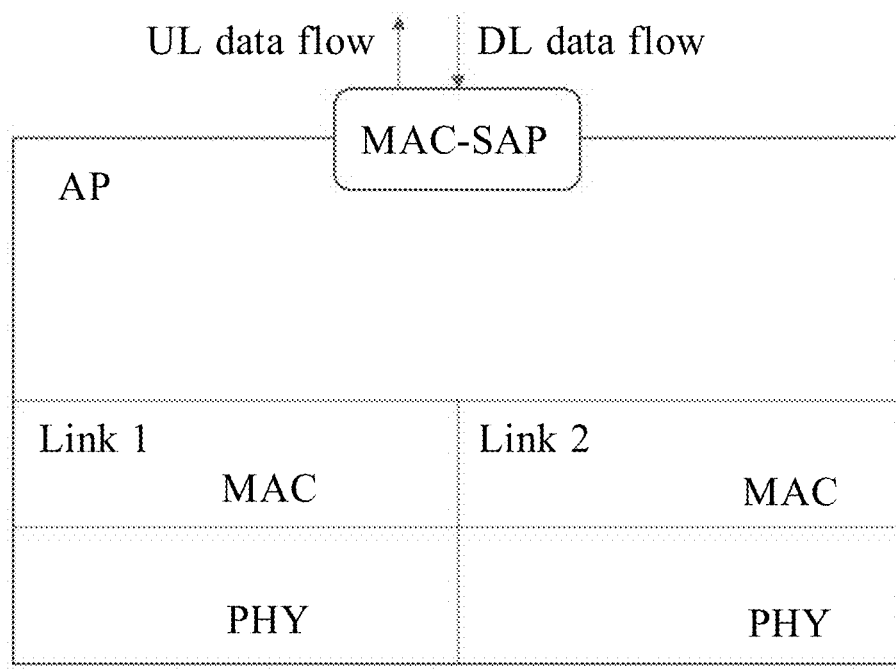
FIG. 3 is a schematic diagram of one Wi-Fi device establishing two links.

In the next-generation standard IEEE 802.11be, a Wi-Fi device can establish a plurality of links at the same time to increase throughput by transmitting in parallel. Specifically, as shown in FIG. 3, a Wi-Fi device establishes two links, a link 1 and a link 2. A data flow generated by an upper-layer application is delivered to the MAC layer through the MAC-SAP interface. Also arriving at the MAC layer with the data flow is the priority field, which is used to indicate the TID (0-7) or TSID (8-15) of the data flow. If the value of the priority field is 8-15, it indicates that the data flow is transmitted in the form of traffic stream, which needs to establish a traffic stream in advance through the interaction between the ADDTS request frame and the ADDTS response frame, and reserve corresponding transmission resources.

Figure 4:
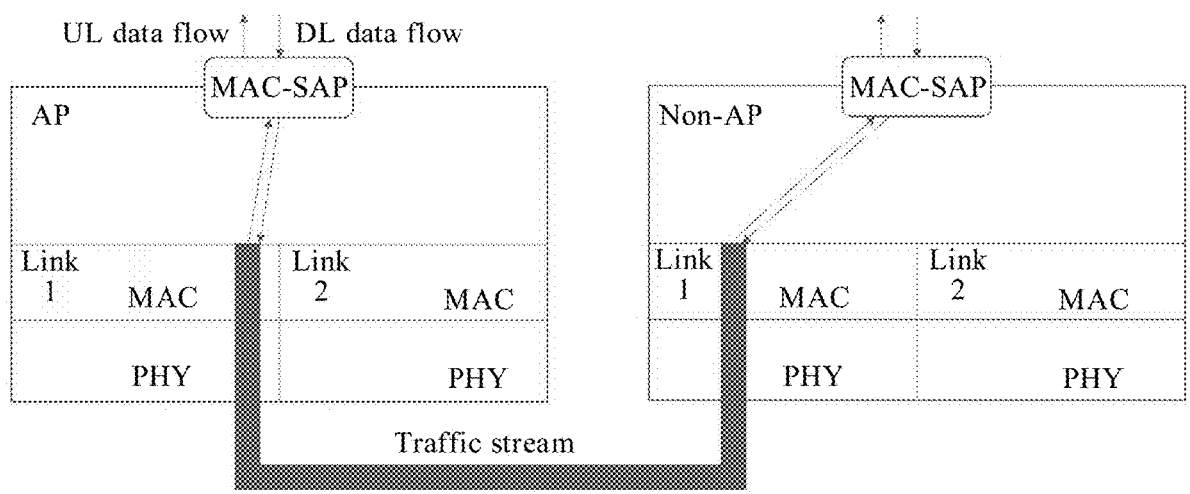
FIG. 4 is a schematic diagram of a multi-link device transmitting and receiving data in the form of traffic stream on one link.

FIG. 4 is a schematic diagram of transmitting and receiving data in the form of traffic stream on one link. The traffic stream established for the corresponding data flow is determined according to the size and interval of the data traffic delivered by the upper layer, as well as the specific bearing capacity of the MAC/PHY, and the bearing capacity of the bottom layer, bound to the link, cannot be directly extended to other newly added links.

Based on this, in the following embodiments of this application, it is provided that a plurality of links of a multi-link device can support a data flow delivered from an upper layer at the same time, thereby improving the capability of processing upper-layer application traffic, and flexibly processing upper-layer data flow, improving the flexibility and efficiency of transmitting data in the form of traffic stream.

The implementation details of the technical solutions in the embodiments of this application are described in detail in the following.

Figure 5:
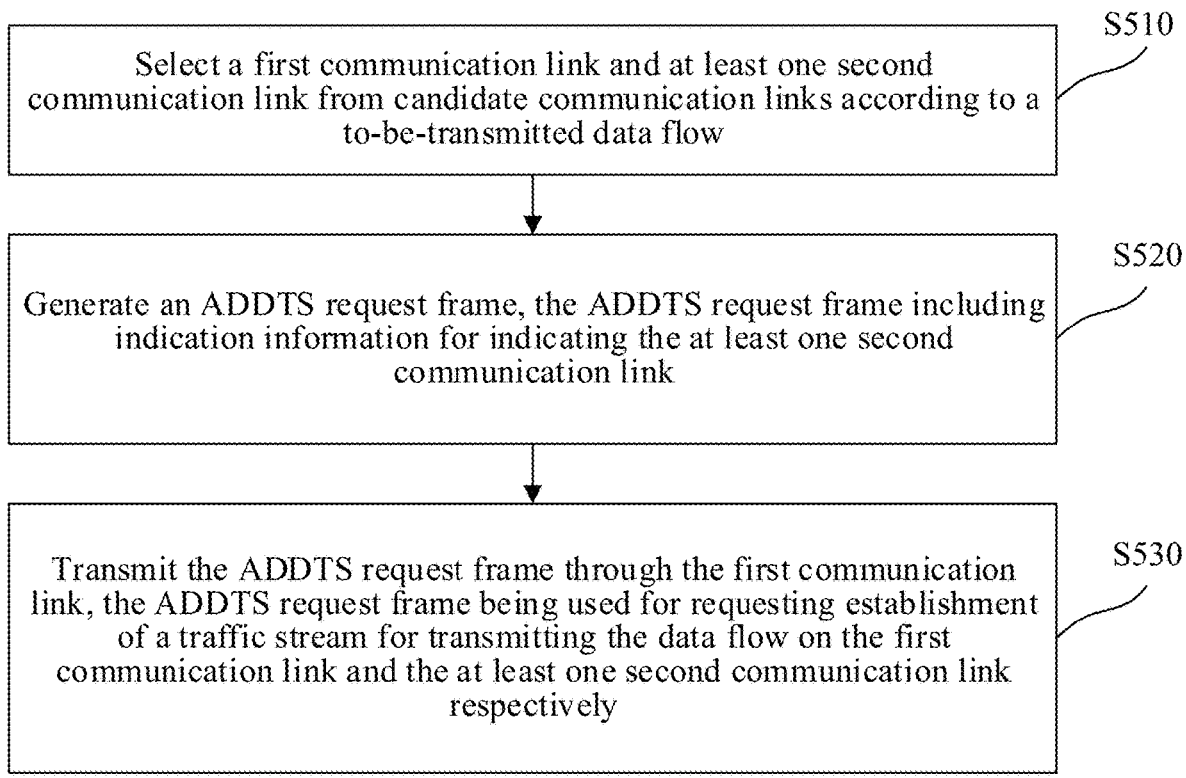
FIG. 5 is a flowchart of a wireless local area network communication method according to various embodiments of the present disclosure.

FIG. 5 is a flowchart of a wireless local area network communication method according to various embodiments of the present disclosure. The wireless local area network communication method may be performed by a device that initiates a process of adding a traffic stream. The device may be, for example, a STA. In some cases, for example, an AP obtains information of a data flow to be transmitted by the STA on the MAC layer, then the AP may alternatively initiate the process of adding a traffic stream.

Referring to FIG. 5, the wireless local area network communication method includes at least step S510 to step S530. A detailed description is as follows:

Step S510. Select a first communication link and at least one second communication link from candidate communication links according to a to-be-transmitted data flow.

In various embodiments of the present disclosure, the first communication link is used for transmitting an ADDTS request frame. The first communication link may be selected according to at least one of the following factors of the candidate communication links: a channel state, a communication capability, and a traffic load of a candidate communication link. For example, a communication link with a low traffic load and a good channel state may be selected from the candidate communication links as the first communication link. The second communication link is used for establishing the same traffic stream as the first communication link. The second communication link may also be selected according to the following factors of the candidate communication links: a channel state, a communication capability, and a traffic load.

In various embodiments of the present disclosure, the first communication link and the at least one second communication link that are selected can support the same channel access method, for example, the enhanced distributed channel access (EDCA) method or the hybrid coordination function controlled channel access (HCCA) method.

Step S520. Generate an ADDTS request frame, the ADDTS request frame including indication information for indicating the at least one second communication link.

In various embodiments of the present disclosure, the indication information included in the ADDTS request frame may include at least one multi-band element field. A quantity of the multi-band element field included in the indication information is the same as a quantity of the second communication link selected, and one multi-band element field is used for indicating one corresponding second communication link. Specifically, assuming that two second communication links are selected, the indication information in the ADDTS request frame includes two multi-band element fields, and each of the two multi-band element fields corresponds to one second communication link.

In some implementations, the indication information comprises at least one multi-band element field, and/or the at least one multi-band element field may be a 1-to-1 corresponding relationship with the at least one second communication link. A quantity of the at least one multi-band element field is same as a quantity of the at least one second communication link. In some implementations, each multi-band element field of the at least one multi-band element field corresponds to each second communication link of the at least one second communication link: each multi-band element field of the at least one multi-band element field is used for indicating one second communication link of the at least one second communication link, and/or each second communication link of the at least one second communication link is used for indicating one multi-band element field of the at least one multi-band element field.

In various embodiments of the present disclosure, if the indication information included in the ADDTS request frame includes at least two multi-band element fields, a position order of the at least two multi-band element fields in the ADDTS request frame is used for indicating a priority order of second communication links corresponding to the at least two multi-band element fields. For example, the ADDTS request frame includes two multi-band element fields, that is, two second communication links are selected, and a first multi-band element field and a second multi-band element field in order correspond to a communication link 21 and a communication link 22 respectively, then a priority of the communication link 21 is greater than a priority of the communication link 22. The priority may be a transmission priority, a resource allocation priority, or the like. For example, when a data flow is transmitted, a transmission resource allocated to the communication link 21 is larger than a transmission resource allocated to the communication link 22.

In various embodiments of the present disclosure, because a plurality of communication links (that is, the first communication link and at least one second communication link) are selected, transmission resources need to be allocated for the plurality of communication links. Various embodiments of the present disclosure provide the following resource allocation methods:

Resource Allocation Method 1:

In various embodiments of the present disclosure, the TSPEC field in the ADDTS request frame may be redesigned. For example, the TSPEC field may include a plurality of surplus bandwidth allowance fields. The plurality of surplus bandwidth allowance fields include a surplus bandwidth allowance field corresponding to the first communication link and a surplus bandwidth allowance field corresponding to each of the at least one second communication link, and a surplus bandwidth allowance field is used for indicating a resource allocated for a corresponding communication link.

In some implementations, each of the ADDTS request frame and the ADDTS response frame includes a traffic specification (TSPEC) field. The TSPEC field includes a plurality of surplus bandwidth allowance fields. The plurality of surplus bandwidth allowance fields includes a first surplus bandwidth allowance field and at least one second surplus bandwidth allowance field: the first surplus bandwidth allowance field corresponding to the first communication link; and/or each of the at least one second surplus bandwidth allowance field corresponding to each of the at least one second communication link. A surplus bandwidth allowance field is used for indicating a resource allocated for a corresponding communication link: the first surplus bandwidth allowance field is used for indicating a resource allocated for the first communication link; and/or the at least one second surplus bandwidth allowance field is used for indicating a resource allocated for the at least one second communication link.

For example, assuming that two second communication links are selected, the TSPEC field may include three surplus bandwidth allowance fields. The three surplus bandwidth allowance fields correspond to the first communication link and the two second communication links respectively, to indicate a resource allocated for a corresponding communication link respectively.

Resource Allocation Method 2:

In various embodiments of the present disclosure, the TSPEC field may be reused directly. In this case, a TSPEC field corresponding to the first communication link and a TSPEC field corresponding to each of the second communication link may be added in the ADDTS request frame, that is, a TSPEC field is used for indicating a resource allocated for a corresponding communication link.

For example, assuming that two second communication links are selected, the ADDTS request frame may include three TSPEC fields. The three TSPEC fields correspond to the first communication link and the two second communication links respectively, to indicate a resource allocated for a corresponding communication link respectively.

Resource Allocation Method 3:

In various embodiments of the present disclosure, the TSPEC field may also be reused directly. However, the surplus bandwidth allowance field included in the TSPEC field is used for indicating transmission resources allocated to the first communication link and the at least one second communication link respectively.

Specifically, a value of the surplus bandwidth allowance field is a floating-point number, an integer part of the floating-point number is used for representing a multiple of the transmission resource allocated to the first communication link according to parameters of the data flow, and a fractional part of the floating-point number is used for representing a multiple of the transmission resource allocated to the second communication link according to the parameters of the data flow. Alternatively, the allocated transmission resources indicated by the surplus bandwidth allowance field in TSPEC may be equally allocated to the first communication link and the second communication link. Alternatively, the allocated transmission resources indicated by the surplus bandwidth allowance field may be respectively allocated to the first communication link and the second communication link.

For example, assuming that one second communication link is selected, and a value of the surplus bandwidth allowance field in TSPEC is 2.4, according to parameters of the data flow, 2 times the transmission resources may be allocated to the first communication link, and 0.4 times the transmission resources may be allocated to the second communication link; or 1.2 times the transmission resources may be allocated to the first communication link and the second communication link respectively; or 2.4 times the transmission resources may be allocated to the first communication link and the second communication link respectively.

In various embodiments of the present disclosure, to flexibly customize the content in the TSPEC field, reserved bits in a traffic stream information field (that is, TS Info field) in TSPEC may be reused to indicate a version number of TSPEC. For example, three bits therein may be used to indicate the version number of TSPEC, and fields included in TSPEC fields of different version numbers indicated by the three bits are different.

Specifically, when the STA transmits the ADDTS request frame, the TSPEC field therein may not include the fields in part 201 shown in FIG. 2, and the QoS requirements of data flow are indicated by the fields in part 202 to facilitate the AP to allocate transmission resources according to the QoS requirements. In this case, the ADDTS response frame returned by the AP needs to include the fields in part 201 shown in FIG. 2, and may also include the fields in part 202 shown in FIG. 2. Optionally, if the AP receives the QoS requirements in the ADDTS request frame transmitted by the STA, the TSPEC field in the ADDTS response frame returned by the AP may not include the fields in part 202 shown in FIG. 2. It can be seen that this way of flexibly defining the content of the TSPEC field can save transmission resources, and to distinguish the TSPEC fields of different formats, the reserved bits in the traffic stream information field in TSPEC may be reused to indicate the version number of TSPEC.

Still refer to FIG. 5. Step S530. Transmit the ADDTS request frame through the first communication link, the ADDTS request frame being used for requesting establishment of a traffic stream for transmitting the data flow on the first communication link and the at least one second communication link respectively.

In various embodiments of the present disclosure, after the ADDTS request frame is transmitted through the first communication link, the ADDTS response frame may be received through the first communication link to determine transmission resources allocated to the first communication link and the at least one second communication link respectively according to the ADDTS response frame.

The embodiment shown in FIG. 5 is a description from the perspective of a device that initiates a process of adding a traffic stream. The following describes a processing process of a device that receives the ADDTS request frame with reference to FIG. 6.

Figure 6:
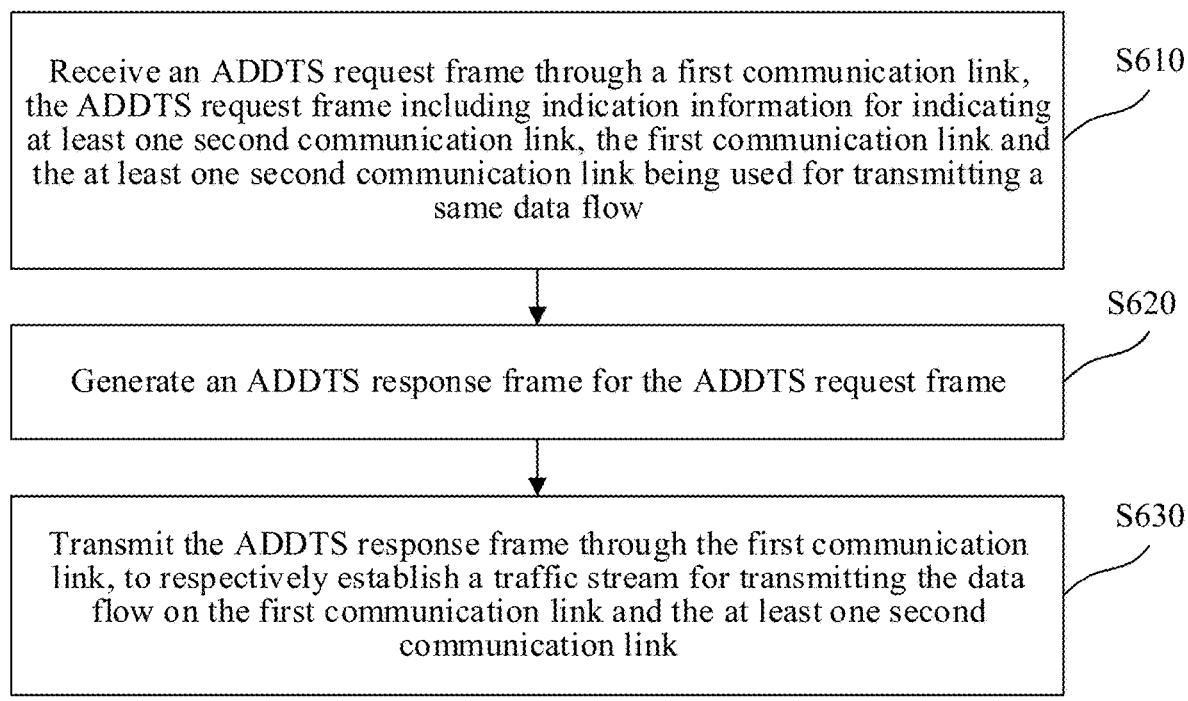
FIG. 6 is a flowchart of a wireless local area network communication method according to various embodiments of the present disclosure.

FIG. 6 is a flowchart of a wireless local area network communication method according to various embodiments of the present disclosure. The wireless local area network communication method may be performed by a device that receives the ADDTS request frame. The device may be, for example, an AP.

Referring to FIG. 6, the wireless local area network communication method includes at least step S610 to step S630. A detailed description is as follows:

Step S610. Receive an ADDTS request frame through a first communication link, the ADDTS request frame including indication information for indicating at least one second communication link, the first communication link and the at least one second communication link being used for transmitting a same data flow.

Step S620. Generate an ADDTS response frame for the ADDTS request frame.

In various embodiments of the present disclosure, because there are a plurality of communication links (that is, the first communication link and at least one second communication link), transmission resources need to be allocated for the plurality of communication links. Various embodiments of the present disclosure provide the following resource allocation methods:

Resource Allocation Method 1:

In various embodiments of the present disclosure, the TSPEC field in the ADDTS response frame may be redesigned. For example, the TSPEC field may include a plurality of surplus bandwidth allowance fields. The plurality of surplus bandwidth allowance fields include a surplus bandwidth allowance field corresponding to the first communication link and a surplus bandwidth allowance field corresponding to each of the at least one second communication link, and a surplus bandwidth allowance field is used for indicating a resource allocated for a corresponding communication link.

For example, assuming that two second communication links are selected, the TSPEC field may include three surplus bandwidth allowance fields. The three surplus bandwidth allowance fields correspond to the first communication link and the two second communication links respectively, to indicate a resource allocated for a corresponding communication link respectively.

Resource Allocation Method 2:

In various embodiments of the present disclosure, the TSPEC field may be reused directly. In this case, a TSPEC field corresponding to the first communication link and a TSPEC field corresponding to each of the second communication link may be added in the ADDTS response frame, that is, a TSPEC field is used for indicating a resource allocated for a communication link.

For example, assuming that two second communication links are selected, the ADDTS response frame may include three TSPEC fields. The three TSPEC fields correspond to the first communication link and the two second communication links respectively, to indicate a resource allocated for a corresponding communication link respectively.

Resource Allocation Method 3:

In various embodiments of the present disclosure, the TSPEC field may also be reused directly. However, the surplus bandwidth allowance field included in the TSPEC field is used for indicating transmission resources allocated to the first communication link and the at least one second communication link respectively.

Specifically, a value of the surplus bandwidth allowance field is a floating-point number, an integer part of the floating-point number is used for representing a multiple of the transmission resource allocated to the first communication link according to parameters of the data flow, and a fractional part of the floating-point number is used for representing a multiple of the transmission resource allocated to the second communication link according to the parameters of the data flow. Alternatively, the allocated transmission resources indicated by the surplus bandwidth allowance field in TSPEC may be equally allocated to the first communication link and the second communication link. Alternatively, the allocated transmission resources indicated by the surplus bandwidth allowance field may be respectively allocated to the first communication link and the second communication link.

For example, assuming that one second communication link is selected, and a value of the surplus bandwidth allowance field in TSPEC is 2.4, according to parameters of the data flow, 2 times the transmission resources may be allocated to the first communication link, and 0.4 times the transmission resources may be allocated to the second communication link; or 1.2 times the transmission resources may be allocated to the first communication link and the second communication link respectively; or 2.4 times the transmission resources may be allocated to the first communication link and the second communication link respectively.

In various embodiments of the present disclosure, to flexibly customize the content in the TSPEC field, reserved bits in a traffic stream information field (that is, TS Info field) in TSPEC may be reused to indicate a version number of TSPEC. For example, three bits therein may be used to indicate the version number of TSPEC, and fields included in TSPEC fields of different version numbers indicated by the three bits are different.

Specifically, when the STA transmits the ADDTS request frame, the TSPEC field therein may not include the fields in part 201 shown in FIG. 2, and the QoS requirements of data flow are indicated by the fields in part 202 to facilitate the AP to allocate transmission resources according to the QoS requirements. In this case, the ADDTS response frame returned by the AP needs to include the fields in part 201 shown in FIG. 2, and may also include the fields in part 202 shown in FIG. 2. Optionally, if the AP receives the QoS requirements in the ADDTS request frame transmitted by the STA, the TSPEC field in the ADDTS response frame returned by the AP may not include the fields in part 202 shown in FIG. 2. It can be seen that this way of flexibly defining the content of the TSPEC field can save transmission resources, and to distinguish the TSPEC fields of different formats, the reserved bits in the traffic stream information field in TSPEC may be reused to indicate the version number of TSPEC.

Still refer to FIG. 6. Step S630. Transmit the ADDTS response frame through the first communication link, to respectively establish a traffic stream for transmitting the data flow on the first communication link and the at least one second communication link.

Figure 7:
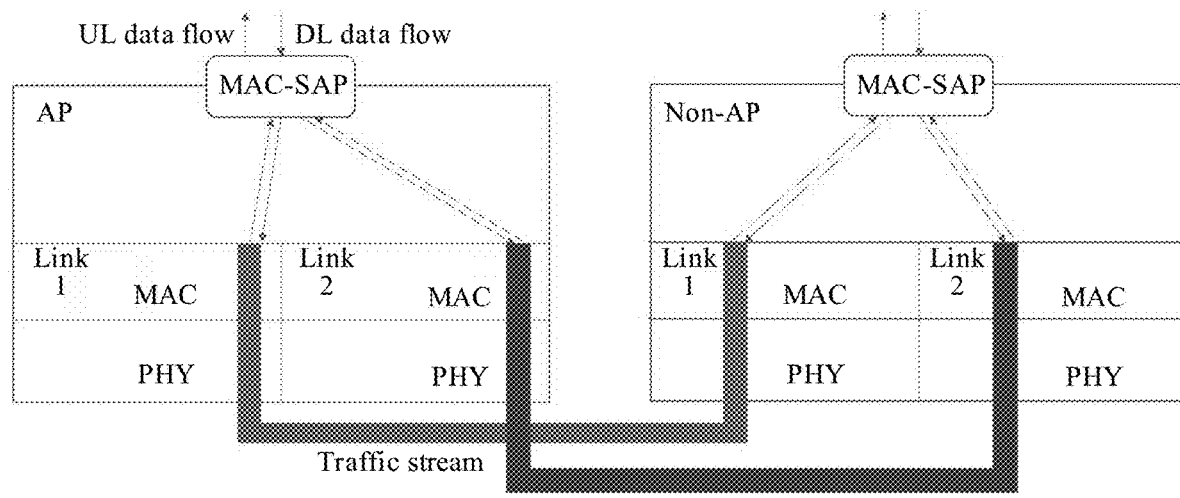
FIG. 7 is a schematic diagram of a multi-link device transmitting and receiving data in the form of traffic stream on a plurality of links according to various embodiments of the present disclosure.

Based on the technical solutions of the embodiments shown in FIG. 5 and FIG. 6, the exchange of ADDTS signaling (that is, ADDTS request frame and ADDTS response frame) may be carried out on only one link, and then TS for the same data flow is established on a plurality of links. Specifically, as shown in FIG. 7, the established multi-Link traffic stream can be used to carry the same upper-layer data flow, that is, the TS for the same data flow is established on a link 1 and a link 2.

The technical solution of this embodiment of this application is described in detail below by using the establishment of TS for the same data flow on two links (that is, a first communication link and a second communication link) as an example:

In various embodiments of the present disclosure, for a to-be-transmitted data flow, a primary link (that is, the first communication link above) and a secondary link (that is, the second communication link above) may be selected from available links according to TSID of the data flow. Then, an ADDTS request frame is transmitted on the primary link, and one or more multi-band elements are added in the ADDTS request frame to indicate the secondary link. The multi-band element is in a one-to-one correspondence with the secondary link. Optionally, if there are a plurality of secondary links, an order of the multi-band elements in the frame indicates a priority of the secondary links.

For different TS, the selected primary link and secondary link may be different. The STA may flexibly select the primary link according to its own condition. For example, the primary link may be selected according to a channel state or a load on the link. Optionally, the primary link and the secondary link can support the same channel access method, for example, EDCA or HCCA.

Because the current definition of TSPEC is not scalable, new fields can only be appended at the end, resulting in unlimited length of TSPEC. Secondly, the current TSPEC format does not support modification. The field definition of TSPEC is to support the channel access modes of HCCA and EDCA. If a link only supports one of the modes, TSPEC will not perform cutting, resulting in a waste of resources. However, in some cases, the field content in TSPEC may be omitted. For example, as described in the foregoing embodiments, when the STA transmits the ADDTS request frame, the TSPEC field therein may not include the fields in part 201 shown in FIG. 2, and the QoS requirements of data flow are indicated by the fields in part 202 to facilitate the AP to allocate transmission resources according to the QoS requirements. In this case, the ADDTS response frame returned by the AP needs to include the fields in part 201 shown in FIG. 2, and may also include the fields in part 202 shown in FIG. 2. Optionally, if the AP receives the QoS requirements in the ADDTS request frame transmitted by the STA, the TSPEC field in the ADDTS response frame returned by the AP may not include the fields in part 202 shown in FIG. 2. It can be seen that this way of flexibly defining the content of the TSPEC field can save transmission resources, and to distinguish the TSPEC fields of different formats, the reserved bits in the TS Info field in TSPEC may be reused to indicate the version number of TSPEC. Specifically, a 3-bit reserved bit may be used to indicate the version number.

In various embodiments of the present disclosure, when resources are allocated to the primary link and the secondary link, a simple resource allocation scheme is to allocate the resources required by the data flow on the primary link, that is, to allocate according to the resources required by the data flow; and allocate redundant resources on the secondary link to provide the required QoS. Therefore, the surplus bandwidth allowance field in TSPEC may be reused. The field includes 2 byte used for representing a floating-point number x.y, which is used for indicating that x.y times of resources are reserved according to the parameters of the current data flow to ensure its QoS requirements. The upper 3 bits are used to indicate the integer part x, and the lower 13 bits indicate the fractional part y. Specifically, x times of resources may be reserved for the primary link, and 0.y times of resources may be reserved for the secondary link. In this case, there is no need to modify the field. Alternatively, x.y times of resources may be equally allocated, that is, x.y/2 times of the resources are allocated on each of the primary link and the secondary link. Alternatively, the same x.y resources may be allocated for each link.

In various embodiments of the present disclosure, resource allocation may be performed by modifying the TSPEC field. For example, two surplus bandwidth allowance fields are added in the TSPEC field, where one surplus bandwidth allowance field is used to indicate the resources allocated to the primary link, and the other surplus bandwidth allowance field is used to indicate the resources allocated to the secondary link.

In various embodiments of the present disclosure, two TSPEC fields may be added in the ADDTS request frame and the ADDTS response frame, where one TSPEC field is used to indicate the resources allocated to the primary link, and the other TSPEC field is used to indicate the resources allocated to the secondary link.

In the technical solutions of the foregoing embodiments of this application, one or more links of a multi-link device can support a data flow delivered from an upper layer at the same time, thereby improving the capability of processing upper-layer application traffic, and flexibly processing upper-layer data flow, improving the flexibility and efficiency of transmitting data in the form of traffic stream.

The following describes apparatus embodiments of this application, which may be used for performing the wireless local area network communication method in the foregoing embodiments of this application. For details not disclosed in the apparatus embodiments of this application, reference may be made to the foregoing wireless local area network communication method embodiments of this application.

Figure 8:
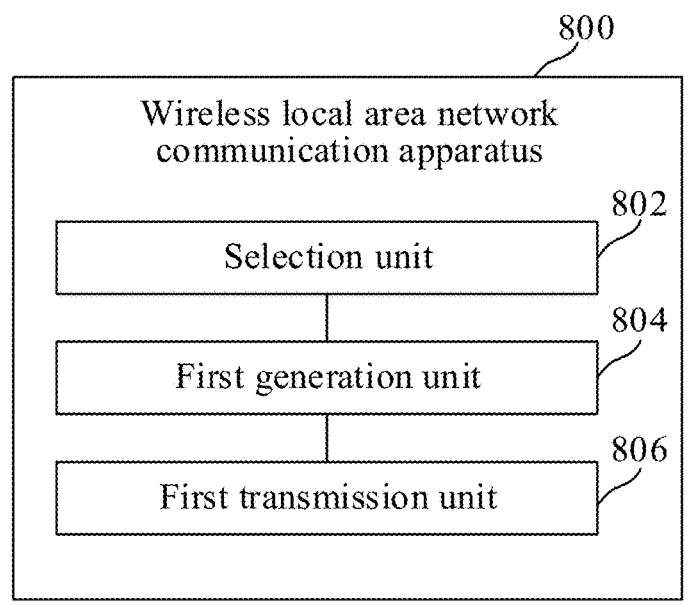
FIG. 8 is a block diagram of a wireless local area network communication apparatus according to various embodiments of the present disclosure.

FIG. 8 is a block diagram of a wireless local area network communication apparatus according to various embodiments of the present disclosure. The wireless local area network communication apparatus may be provided in a device that initiates a process of adding a traffic stream. The device may be, for example, a STA. In some cases, for example, an AP obtains information of a data flow to be transmitted by the STA at the application level, then the AP may alternatively initiate the process of adding a traffic stream.

Referring to FIG. 8, a wireless local area network communication apparatus 800 according to various embodiments of the present disclosure includes: a selection unit 802, a first generation unit 804, and a first transmission unit 806.

The selection unit 802 is configured to select a first communication link and at least one second communication link from candidate communication links according to a to-be-transmitted data flow. The first generation unit 804 is configured to generate an ADDTS request frame, the ADDTS request frame including indication information for indicating the at least one second communication link. The first transmission unit 806 is configured to transmit the ADDTS request frame through the first communication link, the ADDTS request frame being used for requesting establishment of a traffic stream for transmitting the data flow on the first communication link and the at least one second communication link respectively.

In some embodiments of this application, based on the foregoing solutions, the indication information includes at least one multi-band element field, a quantity of the multi-band element field included in the indication information is the same as a quantity of the second communication link selected, and one multi-band element field is used for indicating one corresponding second communication link.

In some embodiments of this application, based on the foregoing solutions, in a case that the indication information includes at least two multi-band element fields, a position order of the at least two multi-band element fields in the ADDTS request frame is used for indicating a priority order of second communication links corresponding to the at least two multi-band element fields.

In some embodiments of this application, based on the foregoing solutions, the wireless local area network communication apparatus 800 further includes: a determining unit, configured to receive an ADDTS response frame through the first communication link, and determine transmission resources allocated to the first communication link and the at least one second communication link respectively according to the ADDTS response frame.

In some embodiments of this application, based on the foregoing solutions, the ADDTS request frame and the ADDTS response frame include a TSPEC field, and the TSPEC field includes a plurality of surplus bandwidth allowance fields. The plurality of surplus bandwidth allowance fields include a surplus bandwidth allowance field corresponding to the first communication link and a surplus bandwidth allowance field corresponding to each of the at least one second communication link, and a surplus bandwidth allowance field is used for indicating a resource allocated for a corresponding communication link.

In some embodiments of this application, based on the foregoing solutions, the ADDTS request frame and the ADDTS response frame include a plurality of TSPEC fields. The plurality of TSPEC fields include a TSPEC field corresponding to the first communication link and a TSPEC field corresponding to each of the at least one second communication link, and a TSPEC field is used for indicating a resource allocated for a corresponding communication link.

In some embodiments of this application, based on the foregoing solutions, the ADDTS request frame and the ADDTS response frame include a TSPEC field, the TSPEC field includes a traffic stream information field, and reserved bits in the traffic stream information field include at least one bit for indicating a version number. Fields included in TSPEC fields of different version numbers indicated by the at least one bit are different.

In some embodiments of this application, based on the foregoing solutions, the ADDTS request frame and the ADDTS response frame include a TSPEC field, the TSPEC field includes a surplus bandwidth allowance field, and the surplus bandwidth allowance field is used for indicating transmission resources allocated to the first communication link and the at least one second communication link respectively.

In some embodiments of this application, based on the foregoing solutions, a value of the surplus bandwidth allowance field is a floating-point number, an integer part of the floating-point number is used for representing a multiple of the transmission resource allocated to the first communication link according to parameters of the data flow, and a fractional part of the floating-point number is used for representing a multiple of the transmission resource allocated to the second communication link according to the parameters of the data flow.

In some embodiments of this application, based on the foregoing solutions, the allocated transmission resources indicated by the surplus bandwidth allowance field are equally allocated to the first communication link and the second communication link; or the allocated transmission resources indicated by the surplus bandwidth allowance field are respectively allocated to the first communication link and the second communication link.

In some embodiments of this application, based on the foregoing solutions, the selection unit 802 is configured to: select the first communication link according to at least one of the following factors of the candidate communication links: a channel state of a communication link, a communication capability of a communication link, and a traffic load of a communication link.

In some embodiments of this application, based on the foregoing solutions, the first communication link and the at least one second communication link support a same channel access method.

Figure 9:
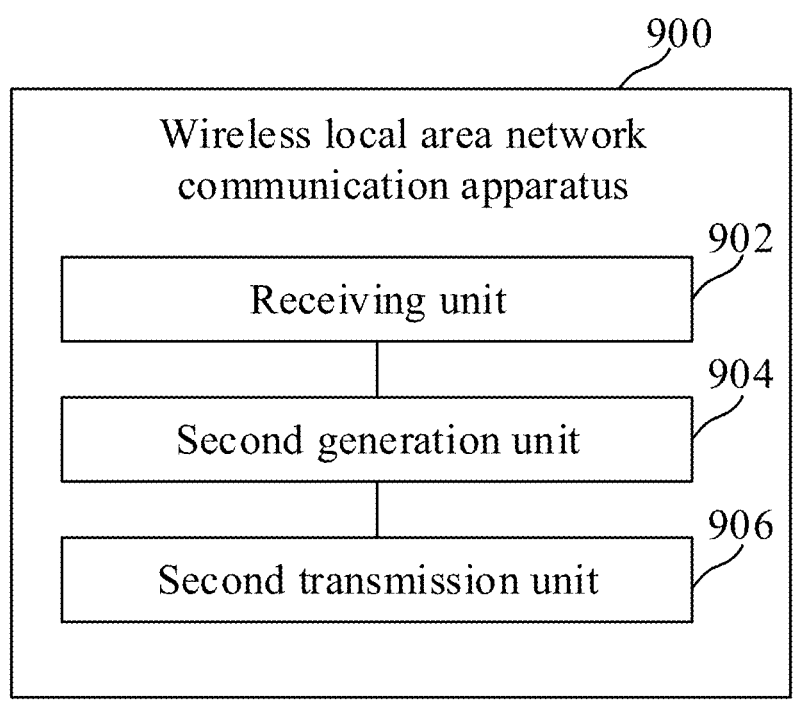
FIG. 9 is a block diagram of a wireless local area network communication apparatus according to various embodiments of the present disclosure.

FIG. 9 is a block diagram of a wireless local area network communication apparatus according to various embodiments of the present disclosure. The wireless local area network communication apparatus may be provided in a device that receives the ADDTS request frame. The device may be, for example, an AP.

Referring to FIG. 9, a wireless local area network communication apparatus 900 according to various embodiments of the present disclosure includes: a receiving unit 902, a second generation unit 904, and a second transmission unit 906.

The receiving unit 902 is configured to receive an ADDTS request frame through a first communication link, the ADDTS request frame including indication information for indicating at least one second communication link, the first communication link and the at least one second communication link being used for transmitting a same data flow. The second generation unit 904 is configured to generate an ADDTS response frame for the ADDTS request frame. The second transmission unit 906 is configured to transmit the ADDTS response frame through the first communication link, to respectively establish a traffic stream for transmitting the data flow on the first communication link and the at least one second communication link.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

Figure 10:
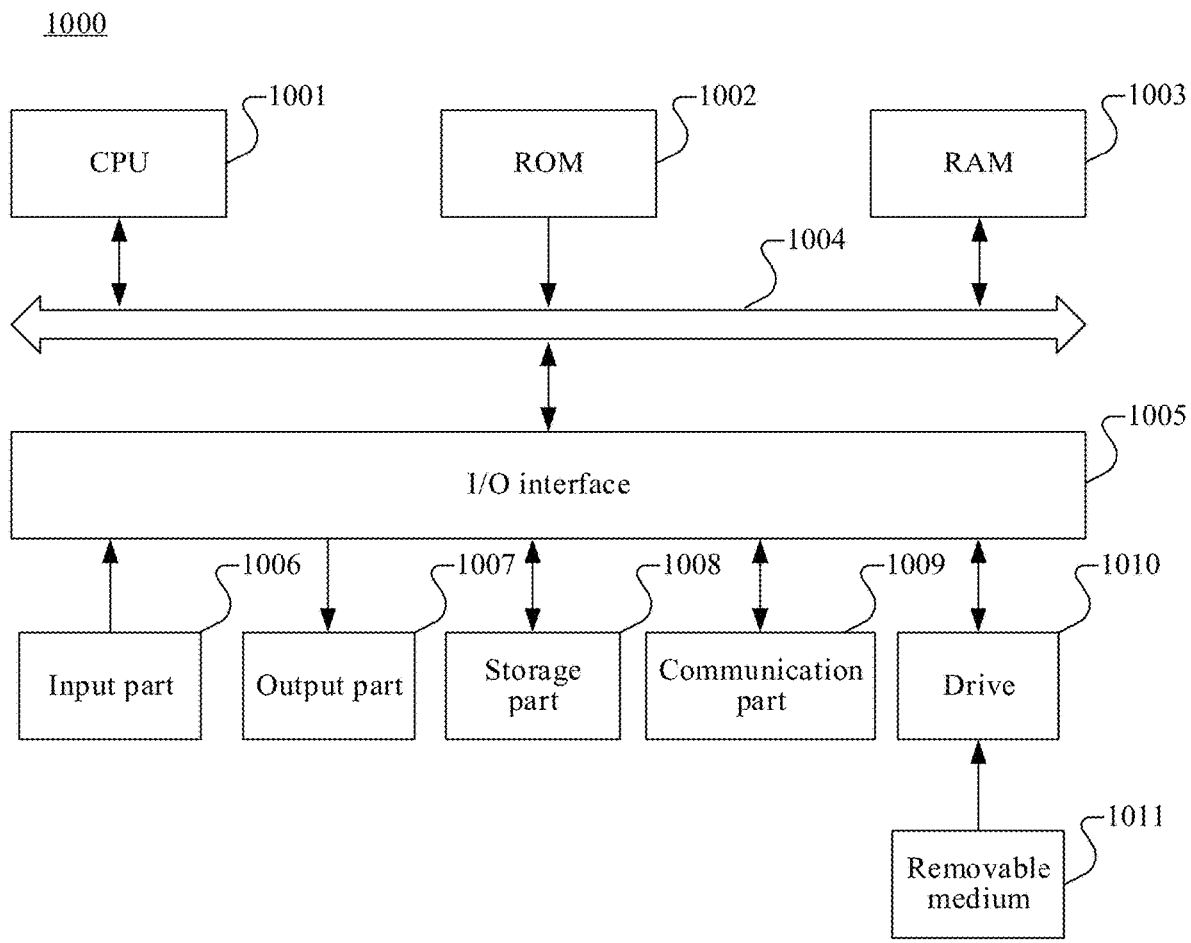
FIG. 10 is a schematic structural diagram of a computer system adapted to implement an electronic device according to various embodiments of the present disclosure.

FIG. 10 is a schematic structural diagram of a computer system adapted to implement an electronic device according to various embodiments of the present disclosure.

The computer system 1000 of the electronic device shown in FIG. 10 is merely an example, and does not constitute any limitation on functions and use ranges of the embodiments of this application.

As shown in FIG. 10, the computer system 1000 includes a central processing unit (CPU) 1001, which may perform various suitable actions and processing based on a program stored in a read-only memory (ROM) 1002 or a program loaded from a storage part 1008 into a random access memory (RAM) 1003, for example, perform the method described in the foregoing embodiments. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following components are connected to the I/O interface 1005: an input part 1006 including a keyboard, a mouse, or the like, an output part 1007 including a cathode ray tube (CRT), a liquid crystal display (LCD), a speaker, or the like, a storage part 1008 including a hard disk, or the like, and a communication part 1009 including a network interface card such as a local area network (LAN) card or a modem. The communication part 1009 performs communication processing via a network such as the Internet. A driver 1010 is also connected to the I/O interface 1005 as required.

A removable medium 1011 such as a magnetic disk, an optical disc, a magneto-optical disk, or a semiconductor memory is installed on the drive 1010 as required, so that a computer program read from the removable medium 1011 is installed into the storage part 1008 as required.

Particularly, according to various embodiments of the present disclosure, the processes described above by referring to the flowcharts may be implemented as computer software programs. For example, various embodiments of the present disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1009, and/or installed from the removable medium 1011. When the computer program is executed by the CPU 1001, the various functions defined in the system of this application are executed.

The computer-readable medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

What is claimed is:

1. A method for wireless local area network communication, the method comprising:
   selecting, by a device comprising a memory storing instructions and a processor in communication with the memory, a first communication link and at least one second communication link from candidate communication links according to a data flow;
   generating, by the device, an adding traffic stream (ADDTS) request frame, the ADDTS request frame comprising indication information for indicating the at least one second communication link; and transmitting, by the device, the ADDTS request frame through the first communication link, the ADDTS request frame being used for requesting establishment of a traffic stream for transmitting the data flow on the first communication link and the at least one second communication link respectively, wherein:
the indication information comprises at least one multi-band element field,
a quantity of the at least one multi-band element field is same as a quantity of the at least one second communication link, and
the at least one multi-band element field and the at least one second communication link have a 1-to-1 corresponding relationship.

2. The method according to claim 1, wherein:
in response to the indication information comprising at least two multi-band element fields, a position order of the at least two multi-band element fields in the ADDTS request frame is used for indicating a priority order of the at least two second communication links corresponding to the at least two multi-band element fields.

3. The method according to claim 1, further comprising:
receiving an ADDTS response frame through the first communication link, and
determining transmission resources allocated to the first communication link and the at least one second communication link respectively according to the ADDTS response frame.

4. The method according to claim 3, wherein:
each of the ADDTS request frame and the ADDTS response frame comprises a traffic specification (TSPEC) field;
the TSPEC field comprises a plurality of surplus bandwidth allowance fields; and
the plurality of surplus bandwidth allowance fields comprise:
a first surplus bandwidth allowance field corresponding to the first communication link,
a second surplus bandwidth allowance field corresponding to each of the at least one second communication link, and
wherein the first surplus bandwidth allowance field and the second surplus bandwidth allowance field are used for indicating a resource allocated for a corresponding communication link.

5. The method according to claim 1, wherein:
the first communication link is selected according to at least one of the following factors of the candidate communication links:
a channel state of a communication link,
a communication capability of a communication link, or
a traffic load of a communication link.

6. The method according to claim 1, wherein:
the first communication link and the at least one second communication link support a same channel access method.

7. An apparatus for wireless local area network communication, comprising:
a memory storing instructions; and
a processor in communication with the memory, wherein, when the processor executes the instructions, the processor is configured to cause the apparatus to perform:

selecting a first communication link and at least one second communication link from candidate communication links according to a data flow,
generating an adding traffic stream (ADDTS) request frame, the ADDTS request frame comprising indication information for indicating the at least one second communication link, and
transmitting the ADDTS request frame through the first communication link, the ADDTS request frame being used for requesting establishment of a traffic stream for transmitting the data flow on the first communication link and the at least one second communication link respectively,
wherein:
the indication information comprises at least one multi-band element field,
a quantity of the at least one multi-band element field is same as a quantity of the at least one second communication link, and
the at least one multi-band element field and the at least one second communication link have a 1-to-1 corresponding relationship.

8. The apparatus according to claim 7, wherein:
in response to the indication information comprising at least two multi-band element fields, a position order of the at least two multi-band element fields in the ADDTS request frame is used for indicating a priority order of the at least two second communication links corresponding to the at least two multi-band element fields.

9. The apparatus according to claim 7, wherein, when the processor executes the instructions, the processor is configured to further cause the apparatus to perform:
receiving an ADDTS response frame through the first communication link, and
determining transmission resources allocated to the first communication link and the at least one second communication link respectively according to the ADDTS response frame.

10. The apparatus according to claim 9, wherein:
each of the ADDTS request frame and the ADDTS response frame comprises a traffic specification (TSPEC) field;
the TSPEC field comprises a plurality of surplus bandwidth allowance fields; and
the plurality of surplus bandwidth allowance fields comprise:
a first surplus bandwidth allowance field corresponding to the first communication link,
a second surplus bandwidth allowance field corresponding to each of the at least one second communication link, and
wherein the first surplus bandwidth allowance field and the second surplus bandwidth allowance field are used for indicating a resource allocated for a corresponding communication link.

11. The apparatus according to claim 7, wherein:
the first communication link is selected according to at least one of the following factors of the candidate communication links:
a channel state of a communication link,
a communication capability of a communication link, or
a traffic load of a communication link.

12. The apparatus according to claim 7, wherein:
the first communication link and the at least one second communication link support a same channel access method.

13. A non-transitory computer-readable storage medium, storing computer-readable instructions, wherein, the computer-readable instructions, when executed by a processor, are configured to cause the processor to perform:
selecting a first communication link and at least one second communication link from candidate communication links according to a data flow;
generating an adding traffic stream (ADDTS) request frame, the ADDTS request frame comprising indication information for indicating the at least one second communication link; and
transmitting the ADDTS request frame through the first communication link, the ADDTS request frame being used for requesting establishment of a traffic stream for transmitting the data flow on the first communication link and the at least one second communication link respectively,
wherein:
the indication information comprises at least one multi-band element field,
a quantity of the at least one multi-band element field is same as a quantity of the at least one second communication link, and
the at least one multi-band element field and the at least one second communication link have a 1-to-1 corresponding relationship.

14. The non-transitory computer-readable storage medium according to claim 13, wherein:
in response to the indication information comprising at least two multi-band element fields, a position order of the at least two multi-band element fields in the ADDTS request frame is used for indicating a priority order of the at least two second communication links corresponding to the at least two multi-band element fields.

15. The non-transitory computer-readable storage medium according to claim 13, wherein, the computer-readable instructions, when executed by the processor, are configured to further cause the processor to perform:
receiving an ADDTS response frame through the first communication link, and
determining transmission resources allocated to the first communication link and the at least one second communication link respectively according to the ADDTS response frame.

16. The non-transitory computer-readable storage medium according to claim 15, wherein:
each of the ADDTS request frame and the ADDTS response frame comprises a traffic specification (TSPEC) field;
the TSPEC field comprises a plurality of surplus bandwidth allowance fields; and
the plurality of surplus bandwidth allowance fields comprise:
a first surplus bandwidth allowance field corresponding to the first communication link,
a second surplus bandwidth allowance field corresponding to each of the at least one second communication link, and
wherein the first surplus bandwidth allowance field and the second surplus bandwidth allowance field are used for indicating a resource allocated for a corresponding communication link.

17. The non-transitory computer-readable storage medium according to claim 13, wherein:
the first communication link is selected according to at least one of the following factors of the candidate communication links:
a channel state of a communication link,
a communication capability of a communication link, or
a traffic load of a communication link.

* * * * *